(12) United States Patent
Tedford

(10) Patent No.: US 12,142,143 B1
(45) Date of Patent: Nov. 12, 2024

(54) VEHICLE ALERT SYSTEM AND METHOD OF USE

(71) Applicant: Terry Tedford, Justin, TX (US)

(72) Inventor: Terry Tedford, Justin, TX (US)

( * ) Notice: Subject to any disclaimer, the term of this patent is extended or adjusted under 35 U.S.C. 154(b) by 109 days.

(21) Appl. No.: 16/943,216

(22) Filed: Jul. 30, 2020

Related U.S. Application Data

(60) Provisional application No. 62/880,159, filed on Jul. 30, 2019.

(51) Int. Cl.
| | |
|---|---|
| *G08G 1/0967* | (2006.01) |
| *G01S 13/931* | (2020.01) |
| *G01S 19/42* | (2010.01) |
| *G08G 1/00* | (2006.01) |
| *G08G 1/16* | (2006.01) |
| *H04W 4/46* | (2018.01) |

(52) U.S. Cl.
CPC ........... *G08G 1/0967* (2013.01); *G08G 1/161* (2013.01); *H04W 4/46* (2018.02); *G01S 13/931* (2013.01); *G01S 2013/9316* (2020.01); *G01S 19/42* (2013.01); *G08G 1/22* (2013.01)

(58) Field of Classification Search
CPC ........ G08G 1/0967; G08G 1/161; G08G 1/22; H04W 4/46; G01S 13/931; G01S 19/42; G01S 2013/9316
See application file for complete search history.

(56) References Cited

U.S. PATENT DOCUMENTS

| | | | |
|---|---|---|---|
| 8,237,555 B2 * | 8/2012 | McCarthy | G08G 1/01 340/936 |
| 9,045,073 B2 | 6/2015 | Thompson, III | |
| 11,210,946 B2 * | 12/2021 | Adkar | G08G 1/096741 |
| 2004/0215373 A1 * | 10/2004 | Won | G08G 1/161 701/1 |
| 2006/0261975 A1 * | 11/2006 | Fridthjof | B60T 8/172 340/905 |
| 2007/0164896 A1 * | 7/2007 | Suzuki | G01S 7/023 342/146 |
| 2014/0097949 A1 * | 4/2014 | Thompson, III | G08G 1/09626 340/441 |
| 2014/0309806 A1 * | 10/2014 | Ricci | H04W 48/04 701/1 |
| 2014/0309885 A1 * | 10/2014 | Ricci | A61B 5/4809 701/41 |
| 2014/0309934 A1 * | 10/2014 | Ricci | B60R 25/00 701/537 |
| 2016/0314359 A1 * | 10/2016 | Sakamoto | G06V 10/50 |
| 2018/0038953 A1 * | 2/2018 | Choi | G01S 13/931 |
| 2018/0224846 A1 * | 8/2018 | Kovacs | H04B 7/0617 |

(Continued)

FOREIGN PATENT DOCUMENTS

WO    WO2015001747 A1    1/2015

*Primary Examiner* — Dale W Hilgendorf
(74) *Attorney, Agent, or Firm* — LEAVITT & ELDREDGE; Richard Eldredge

(57) ABSTRACT

A vehicle alert system includes a device with a display, the device having a control module having a digital addressing system incorporated therein, the digital addressing system to provide communication with a second device; and a GPS module to determine a position of the device; sensors in data communication with the control module, the sensors to detect and determine shapes and road surfaces; the device provides situational awareness and alerts relating to data receive from the sensors.

5 Claims, 4 Drawing Sheets

(56) References Cited

U.S. PATENT DOCUMENTS

| | | | |
|---|---|---|---|
| 2019/0049992 A1* | 2/2019 | Riess | G05D 1/0276 |
| 2019/0051168 A1* | 2/2019 | Du | G08G 1/0112 |
| 2019/0051188 A1* | 2/2019 | Moustafa | G05D 1/0088 |
| 2019/0225142 A1* | 7/2019 | Switkes | B60Q 1/507 |
| 2020/0074862 A1* | 3/2020 | Johnston | G08G 1/22 |
| 2020/0135033 A1* | 4/2020 | Switkes | G08G 1/22 |
| 2021/0065551 A1* | 3/2021 | Manohar | G08G 1/04 |
| 2022/0126864 A1* | 4/2022 | Moustafa | G06T 1/0007 |
| 2023/0311697 A1* | 10/2023 | Lu | H04W 4/021 |
| | | | 701/22 |

* cited by examiner

VEHICLE ALERT SYSTEM AND METHOD OF USE

BACKGROUND

1. Field of the Invention

The present invention relates generally to vehicle alert systems, and more specifically, to a vehicle alert system that incorporates vehicle alert devices that provide for improved communication and situational awareness between a fleet or group of vehicles, thereby providing for improved accident prevention.

2. Description of Related Art

Conventionally, drivers of vehicles in any setting, such as a group of motorcycles, or a group of military personnel, share information in a very limited capacity. In FIG. 1, a flowchart 101 depicts a conventional method, wherein one or more vehicles and drivers utilize conventional global positioning system (GPS) units for navigation and information, and share information with one another via one or more communication devices, such as mobile phones, as shown with boxes 103, 105. It should be appreciated that conventionally, data is not shared between the drivers in real time, thereby leading to a lack of adequate information, which can lead to potential crashes and danger, as shown with boxes 107, 109.

It is desirable, and an object of the present invention, to provide for devices with auto detection using sensor to avoid accidents, bring cohesion to a group of vehicles, humans on the ground, medical personnel, and any and all other personnel, such as command personnel in a military setting. The system is configured to keep information available with active GPS using satellites, or the unit drops to the local GPS to facilitate the communication if and when standard communications are lost, as detected by the device. The system provides the goal of situational awareness for all users, thereby providing for improved safety and security.

Accordingly, although great strides have been made in the area of vehicle alert systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
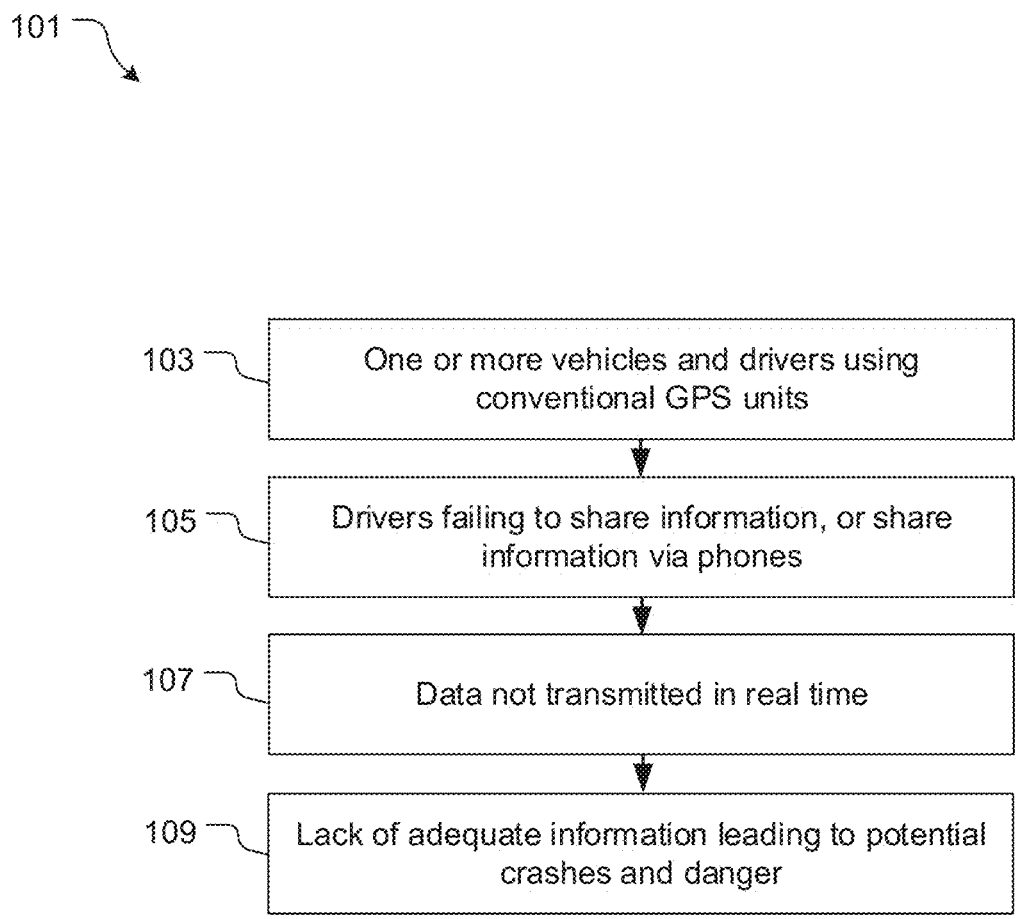
FIG. 1 is a flowchart of a common vehicle alert system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle alert systems. Specifically, the present invention provides for improved situational awareness by sharing data between devices and further provides for improved security through use of a digital addressing system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
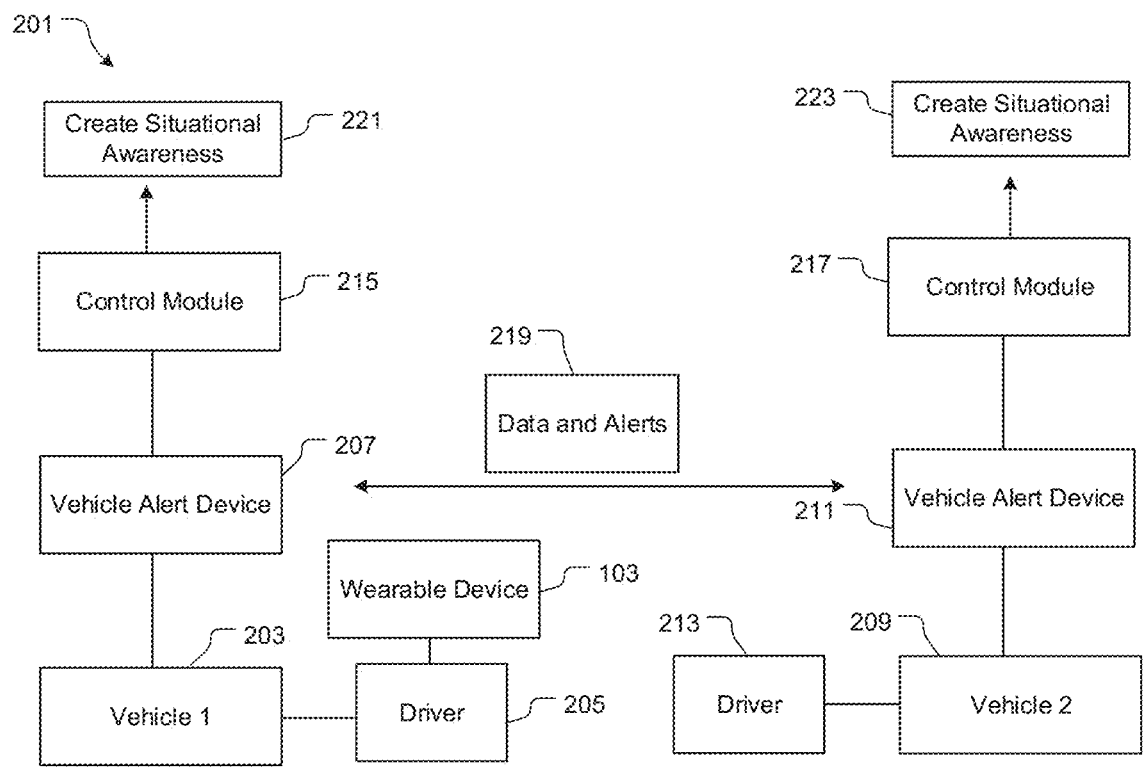
FIG. 2 is a schematic of a vehicle alert system in accordance with a preferred embodiment of the present invention.

Referring now to the drawings wherein like reference characters identify corresponding or similar elements throughout the several views, FIG. 2 depicts a simplified schematic of a vehicle alert system 201 in accordance with a preferred embodiment of the present application. It will be appreciated that system 201 overcomes one or more of the above-listed problems commonly associated with conventional vehicle alert systems.

In the contemplated embodiment, system 201 includes a first vehicle 203 with a driver 205 and a vehicle alert device 207. It should be appreciated that the vehicle 203 could be a motorcycle or alternatively could be a military vehicle, as well as any other vehicle. In addition, it should be appreciated that the vehicle alert device 207 can be mounted to or within the vehicle, or in alternative embodiments, can be carried on a person, such as a wearable device 225.

System 201 can further include a second vehicle 209 with a vehicle alert device 207 and a driver 205. It should also be appreciated that system 201 is configured for use with any number of vehicles and drivers and provides a means to share information readily between the parties.

As shown, the vehicle alert devices 207 include control modules 215, 217 that are configured to collect data through a plurality of sensors, wherein the data, along with appropriate alerts 219, can be readily shared between the devices. It should be appreciated that the sharing of data provides for improved situational awareness 221, 223 for the drivers 205, 213, thereby reducing the likelihood of crashes.

It should be appreciated that one of the unique features believed characteristic of the present application is the configuration of the vehicle alert devices that provides for data collection and facilitation of communication that improves situational awareness.

Figure 3:
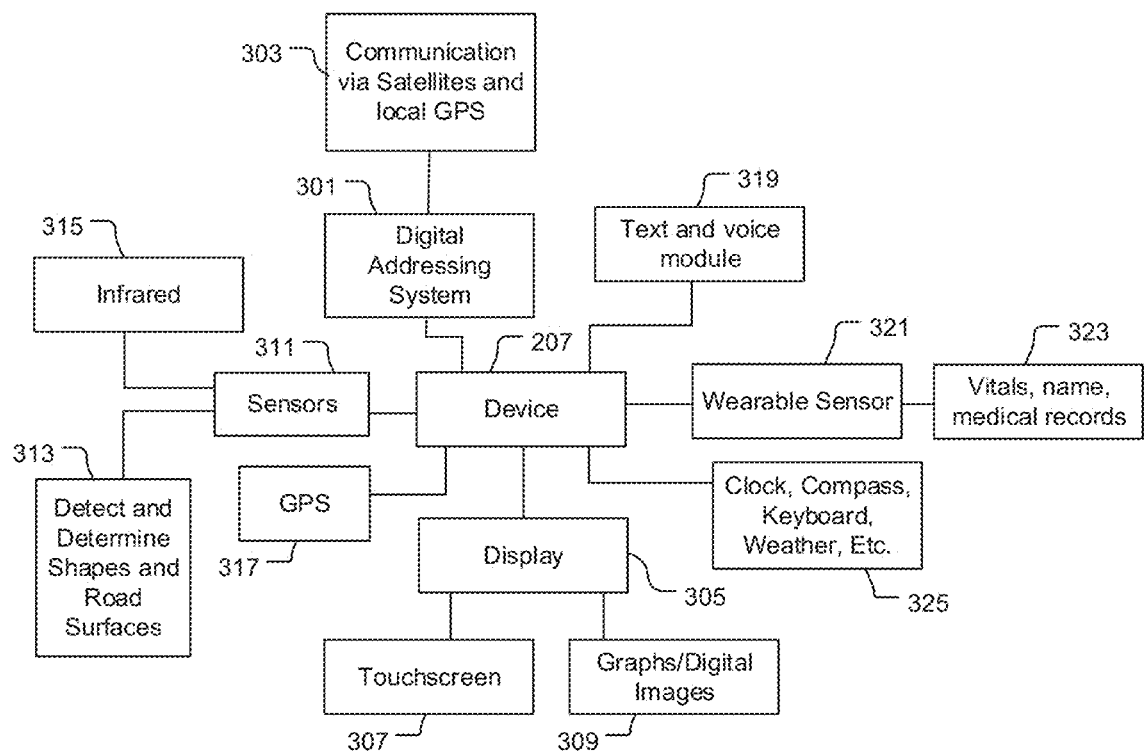
FIG. 3 is a schematic features of an alert device in accordance with the present application.

In FIG. 3, a schematic further depicts the features of the vehicle alert device 207. As shown, the vehicle alert device 207 includes a digital addressing system 301 that provides for communication via satellites and local GPS units 303. It should be appreciated that this feature ensures that if the vehicle alert device drops a connection with a satellite, that the vehicle alert device can continue communication via a local GPS unit.

As further shown, the vehicle alert device 207 can include a display 305. The display 305 can vary, but in the preferred embodiment, includes a touchscreen 307 and can be configured to provide graphs and digital images 309 for the driver. In addition, the vehicle alert device 207 can be in data communication with one or more sensors 311, wherein the one or more sensors 311 are configured to detect and determine shapes and road surfaces 313. This data is used in connection with the display 305 to provide the user with relevant information to their surroundings. It should be appreciated that the sensors 311 can vary, but in some embodiments, an infrared sensor 315 can be used.

The vehicle alert device 207 further includes a GPS unit 317 that provides positioning data associated with the drive/user.

It should be appreciated that the vehicle alert device 207 can further include a text and voice module 319 that provides for the users to communicate in real time.

Some embodiments further include a wearable sensor 321 that is in data communication with the vehicle alert device 207 and is configured to provide information thereto. Some of the information could include, among others, the user's vitals, name, and medical records 323. It should be appreciated that the information can then be transmitted to a medical facility or personnel, thereby allowing for the facility or personnel to better prepare and assist in the event of an emergency.

The vehicle alert device 207 can further include additional components 325, such as a clock, keyboard, compass, and a weather device.

Figure 4:
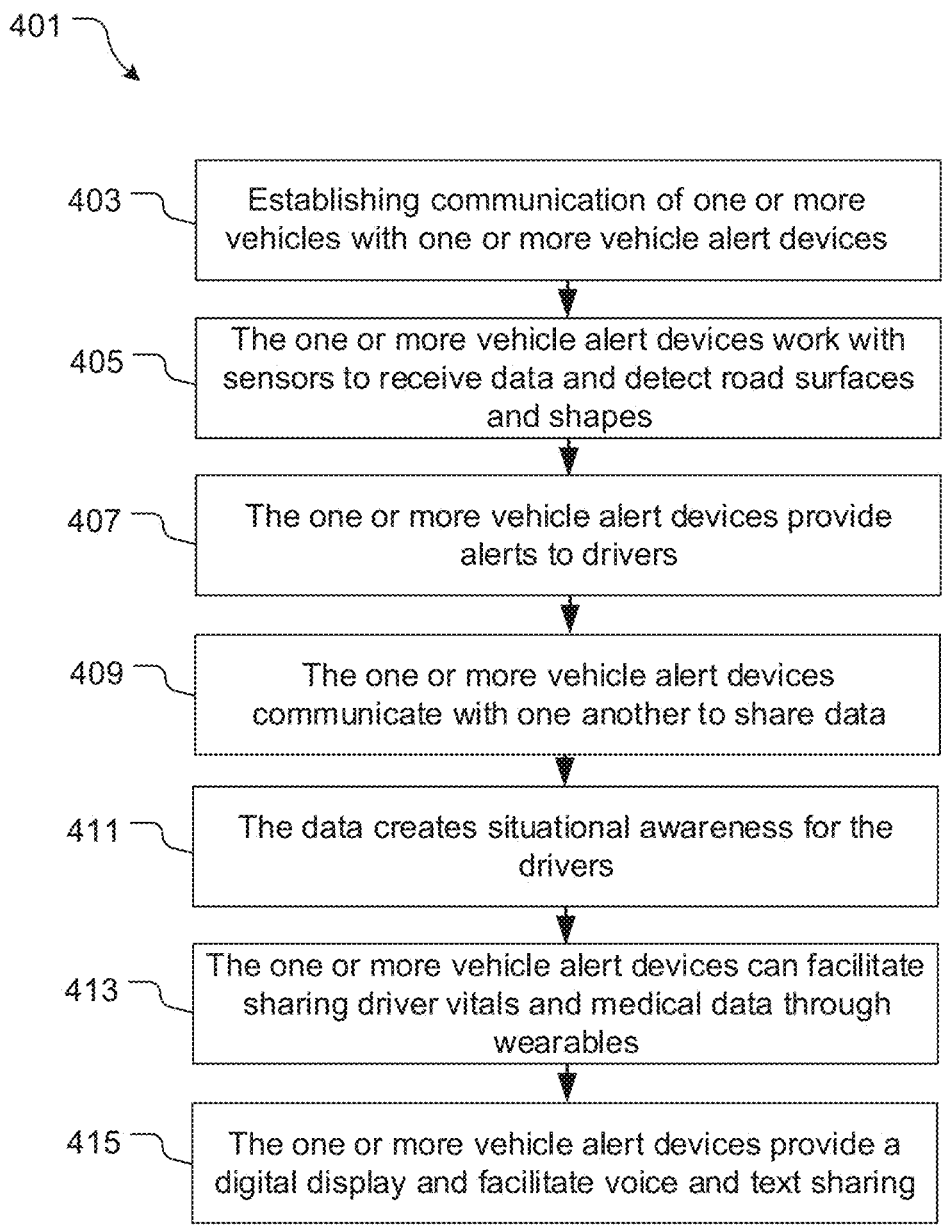
FIG. 4 is a flowchart of the method of use of the system of FIG. 2.

In FIG. 4, a flowchart 401 depicts the method associated with system 201. During use, the vehicle alert devices are installed in vehicles or attached to a person, as shown with box 403. The vehicle alert devices use sensors to collect data based on the surroundings of the vehicle or person, as shown with box 405. The vehicle alert devices can provide alerts to the drivers and communicate through the digital addressing system with other drivers to create situational awareness, as shown with boxes 407, 409, 411. In some embodiments, driver/user vitals and medical data is shared through wearable technology, as shown with box 413. In some embodiments, the devices provide a digital display and facilitate voice and text sharing, as shown with box 415.

It should be appreciated that the system is suitable for use in groups, such as a motorcycle group, or a military group, wherein information can be transmitted rapidly. This allows for the people involved to get instant alerts on evolving events, the entire group to have complete cohesion, and for voice emergency communication.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle alert system for a vehicle, comprising:
   a device with a display, the device having:
      a control module having a digital addressing system incorporated therein, the digital addressing system configured to provide communication with a second device associated with a second driver of a second vehicle; and
      a GPS module configured to determine a position of the device;
   a plurality of sensors in data communication with the control module, the plurality of sensors configured to detect and determine shapes and road surfaces along a road that the vehicle is driving thereon, the plurality of sensors communicate data to the device, which in turn communicates to the second device to notify the second driver; and
   a wearable sensor in communication with the control module, the wearable sensor configured to detect vital signs of a driver and communicate the vital signs to the control module, which in turn is transmitted to a medical facility, the wearable sensor is secured to the driver;
   wherein the wearable sensor is in communication with a medical worker to assist in medical procedures in the event of an accident; and
   wherein the device provides situational awareness and alerts relating to data received from the plurality of sensors and wearable sensor.

2. The system of claim 1, wherein the device further comprises:
   a clock;
   a compass; and
   a keyboard.

3. A method of facilitating communication between a plurality of vehicles, the method comprising:
   providing the system of claim 1; and
   sharing data and alerts between a first vehicle alert device and a second vehicle alert device.

4. The method of claim 3, further comprising:
   creating a digital display on the first vehicle alert device based on data received from the plurality of sensors, the digital display having one or more of a graph and digital images.

5. The method of claim 3, further comprising:
sharing voice and text data between the driver of the vehicle and the second driver through the first vehicle alert device and the second vehicle alert device.

\* \* \* \* \*